Aug. 7, 1951 R. S. NORGARD 2,563,264
LIMB CUTTER
Filed Sept. 29, 1947

INVENTOR
ROSS S. NORGARD
BY
ATTORNEY

Patented Aug. 7, 1951

2,563,264

UNITED STATES PATENT OFFICE 2,563,264

LIMB CUTTER

Ross S. Norgard, Portland, Oreg.

Application September 29, 1947, Serial No. 776,814

1 Claim. (Cl. 30—166)

This invention relates generally to the tree pruners' art and particularly to a limb cutter.

The main object of this invention is to provide a lightweight inexpensive cutter which will be easy to operate thereby minimizing the effort which is normally put forth when much overhead pruning or cutting is performed.

The second object is to provide a cutter which will avoid crushing, splitting or barking the limb during the cutting operation.

I accomplish these and other objects in the manner set forth in the following specification as illustrated in the accompanying drawing, in which.

Similar numbers of reference refer to the same or similar parts throughout the several views.

Figure 1:
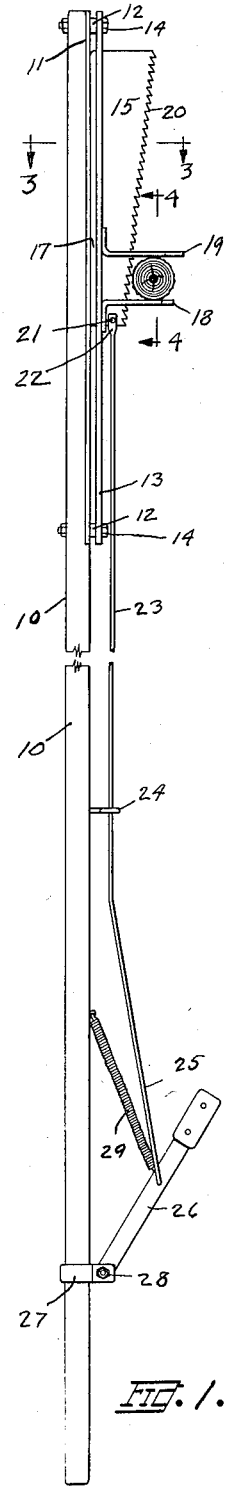
Fig. 1 is a side elevation of the limb cutter.
Figure 2:
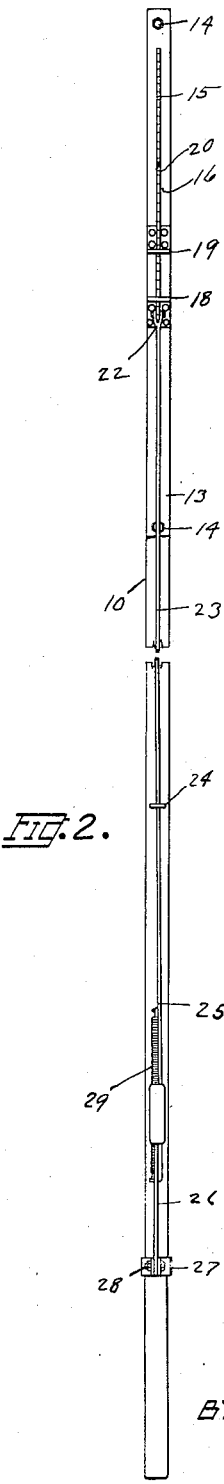
Fig. 2 is an edge elevation of the limb cutter.
Figure 4:
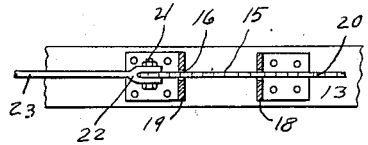
Fig. 4 is a transverse section taken along the line 4—4 in Fig. 1.
Figure 3:
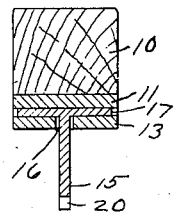
Fig. 3 is a transverse section taken along the line 3—3 in Fig. 1.

Referring in detail to the drawing, there is shown a pole 10 on one end of which is imbedded a metal plate 11 constituting the bottom of a saw guide. Spaced from the plate 11 by the washers 12 is a slotted plate 13 which is held in place by the bolts 14 which pass through the members 10, 11, 12 and 13. The saw element 15 is slidable in the slot 16 formed in the plate 13 and the T-shaped back 17 is slidable between the members 11 and 13.

Mounted on the plate 13 are the limb guides 18 and 19 which are spaced apart a distance greater than the largest limb to be cut. The saw 15 is preferably tapering so that its teeth 20 will feed into the cut.

Attached to the saw 15 by means of a pin 21 is the forked end 22 of a slide rod 23 which guides in a screw eye 24 mounted on the pole 10. The rod 23 has a bent end 25 which is attached to an operating lever 26 which is hinged to a clamp 27 by a bolt 28 which also serves to hold the clamp 27 in place on the pole 10.

A tension spring 29 between the pole 10 and the lever 26 assists in the back stroke of the saw and holds it normally in an uppermost position.

This limb cutter is operated in the same manner as is the ordinary pruner except that for large limbs a pumping action may be required. By keeping the saw in good condition clean cuts may be made and all tendency to crush or tear the limb will be overcome.

Many forms of pole pruners have been constructed in the past. I, therefore, am not claiming such devices broadly but I do intend to cover all such forms and modifications thereof as fall fairly within the following claim.

I claim:

A limb cutter comprising an elongated pole having a handle at one end thereof, a saw guide at the other end of said pole parallel therewith, a pair of parallel limb guides attached to said pole normal thereto and between the ends of said saw guide, each of said limb guides having a slot formed therein adjacent said saw guide, a tapered saw within said slots guided by said saw guide, a saw actuating lever at the handle end of said pole having a connecting link to said saw and a spring for urging said saw away from the handled end of said pole.

ROSS S. NORGARD.

REFERENCES CITED

The following references are of record in the file of this patent:

UNITED STATES PATENTS

| Number | Name | Date |
|---|---|---|
| 973,582 | Swegles | Oct. 25, 1910 |
| 2,150,268 | Denton | Mar. 14, 1939 |

FOREIGN PATENTS

| Number | Country | Date |
|---|---|---|
| 680,109 | France | Jan. 17, 1930 |